Patented Aug. 29, 1933

1,924,766

UNITED STATES PATENT OFFICE 1,924,766

PROCESS FOR THE PRODUCTION OF CARBOXYLIC ACIDS

Gilbert B. Carpenter, Bellemoor, Del., assignor to E. I. du Pont de Nemours & Company, Wilmington, Del., a corporation of Delaware No Drawing. Application August 24, 1931
Serial No. 559,130

27 Claims. (Cl. 260—116)

This invention relates to the synthesis of organic compounds and particularly to the preparation of higher aliphatic acids by the interaction of olefinic hydrocarbons, carbon monoxide, and steam.

Aliphatic acids of a higher order such as propionic acid, butyric acids, etc., have been heretofore prepared by various methods. For example, propionic acid has been obtained by the reduction of acrylic or lactic acid; by suitable Schizomycetes fermentation of the lactate or malate of calcium; or by the oxidation of propyl alcohol with dichromate solution. Such methods of preparation are necessarily expensive due principally to the relatively high cost of the raw materials. Owing to the many important uses to which acids of this type are adaptable, many of which uses have not been exploited extensively due to their present high cost, it is obvious that a process for their preparation from raw materials, which are, at present, readily available and which will be even more readily available in the near future, will be of far-reaching importance in this art.

It is an object of the present invention to provide a process for the synthesis of aliphatic acids from simpler and less costly raw materials than have previously been used. Other objects and advantages will hereinafter appear.

I have found that aliphatic acids of a higher order can be produced by the reaction of steam, carbon monoxide, and an olefinic hydrocarbon; that is an aliphatic hydrocarbon containing a double bond,—for example, the olefines; ethylene, propylene, butylene, etc. These hydrocarbons may be represented generically by the formula—$RR_1C:CR_2R_3$—in which R, $R_1$, $R_2$, and $R_3$ represent hydrogen (H) or an alkyl radical. The acid-forming reaction of the hydrocarbons with steam and carbon monoxide apparently proceeds in accordance with the equation—

Thus ethylene, for example, reacts with steam and carbon monoxide to form propionic acid:

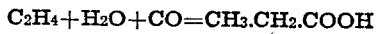

Propylene and butylene similarly yield butyric and valeric acids, respectively.

Raw materials suitable for use in the process are readily available from a number of sources. Thus, ethylene and various homologues thereof are found in the gases evolved in cracking petroleum and may be separated therefrom, for example, by fractional liquefaction. It is preferable, for the sake of avoiding undesirable byproducts, that the hydrocarbon which it is desired to convert be employed in a relatively high degree of purity.

The carbon monoxide required for the synthesis may conveniently be derived from various commercial sources, such as, for example, water gas, producer gas, etc., by liquefaction or other methods, and should likewise for the best results be relatively pure, it being particularly desirable to avoid the presence therein of sulfur compounds and metallic carbonyls.

Inert gases, such as nitrogen, methane, and carbon dioxide, may be included with the reactants, this being advantageous in some cases from the standpoint of controlling the temperature of the exothermic reaction and of limiting the extent thereof, where it may be desired to restrict the overall conversion of the reactants for the sake of enhancing the relative yield of the desired acids. When employing one or more of the above gases as inert carriers to effect these advantages, it or they shall generally be present in amounts constituting approximately 40% or more by volume of the whole gaseous mixture, including the steam.

The relative proportions of the reactants can be varied although it has been found that in order to avoid side reactions involving the olefine it is advantageous to work with the steam and carbon monoxide in excess with respect to the olefinic hydrocarbon. Concentrations of the latter within the range of from 1½ to 10% by volume of the total reactants have been employed with pressures of 500 atmospheres or more, with particularly good results. Higher concentrations may be used but under such conditions correspondingly lower pressures should be employed.

The use of pressures in excess of atmospheric, say from 25 to 900 atmospheres, is preferred. The reaction proceeds over a wide range of temperatures while working under these pressures although the optimum temperature varies with specific cases, depending inter alia upon the hydrocarbon being used. Generally the desired reaction can be obtained at from 200° to 500° C. From the standpoint of practical operation the temperature should not be so low that the reaction rate is uneconomical nor so high as to result in undesirable byproducts by decomposition and/or polymerization of raw materials. From this point of view the process has been found to operate satisfactorily at from 275° to 375° C.

The following examples will illustrate methods of practising the invention, although the invention is not limited to the examples.

*Example 1.*—A gas mixture consisting of 90% by volume of carbon monoxide, 2% ethylene, and 8% steam, was passed, at a pressure of 700 atmospheres, and a temperature of 325° C., over a catalyst consisting of phosphoric acid. The catalyst was prepared by heating activated charcoal, soaking it in dilute phosphoric acid for several hours and drying it at 125° C. A condensate was obtained, upon cooling the converted gases, which contained 22% propionic acid.

*Example 2.*—A gas mixture containing by volume 70 parts of carbon monoxide, 5 parts of ethylene, 25 parts of steam, was passed at a temperature of 325° C. and a pressure of 700 atmospheres, over an activated charcoal catalyst. The condensate obtained upon cooling the product indicated a conversion of 45% of the reacted ethylene to propionic acid. Other aliphatic carboxylic acids were likewise present.

*Example 3.*—The gaseous mixture of ethylene, carbon monoxide, and steam of Example 2, with approximately 35% by volume of nitrogen, was passed over a calcium iodide catalyst supported on activated charcoal. A good yield of aliphatic carboxylic acids was realized.

Other catalysts that may be employed in the process include generally inorganic acids that are not substantially volatilized at the temperature of the synthesis, e. g. acids of phosphorus, arsenic, and boron. Activated charcoal alone has proven to be a good catalyst for the reaction and when used in conjunction with the inorganic acids, particularly so. The following catalysts have likewise given a good conversion of the ethylene to propionic acid; calcium chloride, cadmium phosphate, silico-tungstic acid, zinc chloride, calcium fluoride, calcium iodide, sodium bromide, and potassium fluoride.

The apparatus, which may be employed for conducting these reactions, may be of any conventional type and preferably one in which the temperature of exothermic reactions can be readily controlled at the desired value. Owing to the corrosive action of the acids produced, the interior of the converter and conduits leading therefrom should preferably be protected. This may be accomplished by using glass or glass-lined apparatus or by coating the inner surfaces of the apparatus with chromium or silver or using for the construction of this equipment acid-resisting alloys of, for example, molybdenum, cobalt, tungsten, chromium, manganese or nickel.

Various changes may be made in the method hereinbefore described without departing from the invention or sacrificing the advantages thereof.

I claim:

1. The process of producing aliphatic carboxylic acids which comprises reacting a gaseous mixture consisting essentially of an olefinic hydrocarbon, steam and carbon monoxide substantially in accordance with the equation

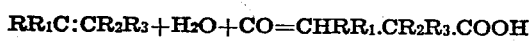
$$RR_1C:CR_2R_3 + H_2O + CO = CHRR_1.CR_2R_3.COOH$$

in which R, $R_1$, $R_2$ and $R_3$ represent hydrogen (H) or an alkyl radical.

2. The process which comprises reacting a gaseous mixture consisting essentially of an olefine, steam, and carbon monoxide and thereby producing an aliphatic carboxylic acid.

3. The process which comprises reacting a gaseous mixture consisting essentially of ethylene, steam, and carbon monoxide and thereby producing propionic acid.

4. A process of reacting an olefinic hydrocarbon, steam, and carbon monoxide and thereby producing an aliphatic carboxylic acid, characterized in that an excess of steam and carbon monoxide is employed with relation to the olefinic hydrocarbon.

5. A process of reacting an olefinic hydrocarbon, steam, and carbon monoxide and thereby producing an aliphatic carboxylic acid, characterized in that the reaction is effected under a pressure within the range of from 25 to 900 atmospheres.

6. A process of reacting an olefinic hydrocarbon, steam, and carbon monoxide and thereby producing an aliphatic carboxylic acid, characterized in that the reaction is effected at a temperature within the range of from 200 to 500° C.

7. A process of reacting an olefinic hydrocarbon, steam, and carbon monoxide and thereby producing an aliphatic carboxylic acid, characterized in that the reaction is effected in the presence of a catalyst selected from the group of acidic bodies consisting of inorganic acids, substantially non-volatile under the conditions of working.

8. A process of reacting an olefinic hydrocarbon, steam, and carbon monoxide and thereby producing an aliphatic carboxylic acid, characterized in that the reaction is effected in the presence of an activated charcoal catalyst.

9. A process of reacting an olefinic hydrocarbon, steam, and carbon monoxide and thereby producing an aliphatic carboxylic acid, characterized in that the reaction is effected in the presence of a catalyst selected from the group of acidic bodies consisting of inorganic acids, substantially non-volatile under the conditions of working, in conjunction with activated charcoal.

10. A process of reacting an olefinic hydrocarbon, steam, and carbon monoxide and thereby producing an aliphatic carboxylic acid, characterized in that the reaction is effected in the presence of a phosphoric acid catalyst.

11. A process of reacting ethylene, steam and carbon monoxide and thereby producing propionic acid, characterized in that an excess of steam and carbon monoxide is employed with relation to the olefinic hydrocarbon.

12. A process of reacting ethylene, steam and carbon monoxide and thereby producing propionic acid, characterized in that the reaction is effected under a pressure within the range of from 25 to 900 atmospheres.

13. A process of reacting ethylene, steam and carbon monoxide and thereby producing propionic acid, characterized in that the reaction is effected at a temperature within the range of from 100 to 500° C.

14. A process of reacting ethylene, steam and carbon monoxide and thereby producing propionic acid, characterized in that the reaction is effected in the presence of a catalyst selected from the group of acidic bodies consisting of inorganic acids, substantially non-volatile under the conditions of working.

15. A process of reacting ethylene, steam and carbon monoxide and thereby producing propionic acid, characterized in that the reaction is effected in the presence of a phosphoric acid catalyst.

16. The process which comprises reacting a gaseous mixture consisting essentially of propylene, steam, and carbon monoxide and thereby producing an aliphatic carboxylic acid.

17. The process which comprises reacting a gaseous mixture consisting essentially of butylene, steam, and carbon monoxide and thereby producing an aliphatic carboxylic acid.

18. The process of producing aliphatic carboxylic acids which comprises reacting a gaseous mixture consisting of an olefinic hydrocarbon, steam, carbon monoxide, and an inert gas, in accord with the equation:

$$RR_1C=CR_2R_3+H_2O+CO=CHRR_1-CR_2R_3-COOH,$$

in which R, $R_1$, $R_2$ and $R_3$ represent hydrogen (H) or an alkyl radical.

19. In a process for the production of aliphatic carboxylic acids the step which comprises reacting an olefinic hydrocarbon, steam, and carbon monoxide substantially in accord with the equation:

$$RR_1C=CR_2R_3+H_2O+CO=CHRR_1-CR_2R_3-COOH$$

in which R, $R_1$, $R_2$ and $R_3$ represent hydrogen (H) or an alkyl radical, at a temperature below 500° C.

20. In a process for the preparation of carboxylic acids the step which comprises reacting an olefine, steam, and carbon monoxide at a temperature below 500° C.

21. In a process for the preparation of propionic acid, the step which comprises reacting ethylene, steam, and carbon monoxide at a temperature below 500° C.

22. In a process for the preparation of aliphatic carboxylic acids the step which comprises reacting propylene, steam, and carbon monoxide at a temperature below 500° C.

23. In a process for the preparation of aliphatic carboxylic acids the step which comprises reacting butylene, steam, and carbon monoxide at a temperature below 500° C.

24. In a process for the preparation of aliphatic carboxylic acids the steps which comprise reacting an olefinic hydrocarbon, steam, and carbon monoxide, cooling the gaseous product obtained and separating therefrom the aliphatic carboxylic acid.

25. In a process for the preparation of propionic acid the steps which comprise reacting ethylene, steam, and carbon monoxide, cooling the gaseous product, and separating therefrom the propionic acid formed from the unreacted constituents of the gaseous mixture.

26. In a process for the preparation of aliphatic carboxylic acids the step which comprises passing into the reaction zone an olefinic hydrocarbon, steam, and carbon monoxide.

27. In a process for the preparation of propionic acid the step which comprises passing into the reaction zone ethylene, steam, and carbon monoxide.

GILBERT B. CARPENTER.